(12) United States Patent
Doddaiah

(10) Patent No.: US 12,379,962 B2
(45) Date of Patent: Aug. 5, 2025

(54) STORAGE ARRAY RESOURCE ALLOCATION BASED ON FEATURE SENSITIVITIES

(71) Applicant: Dell Products L.P., Round Rock, TX (US)

(72) Inventor: Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 679 days.

(21) Appl. No.: 17/581,402

(22) Filed: Jan. 21, 2022

(65) Prior Publication Data
US 2023/0236885 A1    Jul. 27, 2023

(51) Int. Cl.
*G06F 9/50*    (2006.01)

(52) U.S. Cl.
CPC ...... *G06F 9/5005* (2013.01); *G06F 2209/501* (2013.01)

(58) Field of Classification Search
CPC ................... G06F 9/5005; G06F 2209/501
See application file for complete search history.

(56) References Cited

U.S. PATENT DOCUMENTS

2017/0115878 A1*  4/2017  Dewaikar ............. G06F 3/0689

* cited by examiner

*Primary Examiner* — Wissam Rashid
(74) *Attorney, Agent, or Firm* — Krishnendu Gupta; Nikhil Patel

(57) ABSTRACT

Aspects of the present disclosure relate to tuning resource allocations based on a storage array feature's impact on the array's global performance. In embodiments, one or more input/output (IO) features used by a storage array to process one or more IO workloads are determined. Additionally, each IO feature's impact for processing the IO workload within a threshold performance requirement can be determined. Further, at least one IO feature's resource allocation can be tuned based on its IO workload processing impact.

18 Claims, 5 Drawing Sheets

STORAGE ARRAY RESOURCE ALLOCATION BASED ON FEATURE SENSITIVITIES

BACKGROUND

A storage array, also called a disk array, is a data storage system for block-based storage, file-based storage, or object storage. A storage array can use multiple drives (e.g., spinning hard disk drives (HDDs) or solid-state drives (SSDs)) to store a large amount of data. Further, a storage array can include memory that stores quick access copies of data stored in a drive. Additionally, a storage array can include a management system that manages the array's storage devices, memory, and computing resources.

SUMMARY

Aspects of the present disclosure relate to identifying and controlling the sensitivity of a storage array's hyper-parameters. For example, the aspects can tune the storage array's resource allocations based on an array feature's impact on the array's global performance. In embodiments, one or more input/output (IO) features used by a storage array to process one or more IO workloads are determined. Additionally, each IO feature's impact for processing the IO workload within a threshold performance requirement can be determined. Further, at least one IO feature's resource allocation can be tuned based on its IO workload processing impact.

In embodiments, a configuration element can be parsed to determine the storage array's one or more IO features.

In embodiments, each IO feature's maximum load to process the IO workload can be determined.

In embodiments, each IO feature's IO processing capabilities can be measured based on one or more current and/or historical IO workloads.

In embodiments, a tensor that maps each IO feature to their respective maximum IO processing loads can be generated.

In embodiments, the tensor can have a length corresponding to a number of the determined IO features.

In embodiments, a saliency parameter value related to each IO feature can be initialized. Additionally, a searchable saliency data structure can be generated. Further, the tensor can be mapped to the searchable saliency data structure.

In embodiments, each IO feature's corresponding tensor record can be perturbed using each IO feature's corresponding saliency parameter value.

In embodiments, at least one of the storage array's IO response times and input/output per second (IOP) rates can be measured in response to receiving the IO workload. Additionally, at least one of the IO response times and IOP rates can be correlated to one of the IO features. Further, each IO feature's impact on at least one of the IO response times and IOP rates can be determined based on the correlation.

In embodiments, at least one IO feature's resource allocation can be tuned based on its determined impact on the at least one of the IO response times and IOP rates in response to receiving the IO workload.

BRIEF DESCRIPTION OF THE DRAWINGS

The foregoing and other objects, features, and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

To users, a storage array is like a black box because it includes hundreds of hyperparameters (e.g., features) across the array's distinct logic/hardware layers. As such, users cannot easily determine a feature's sensitivity (e.g., impact) on the array's global workload performance. Specifically, the number of features and layers requires a significant amount of computational resources, and there are no developers with global-level expertise in the storage array. Thus, current naïve resource management techniques only tune local array layers.

Embodiments of the present disclosure globally tune an array's resources allocated to features. For example, the embodiments can use a gradient-based machine learning technique that learns each feature's sensitivity to a given workload as described in greater detail herein.

Figure 1:
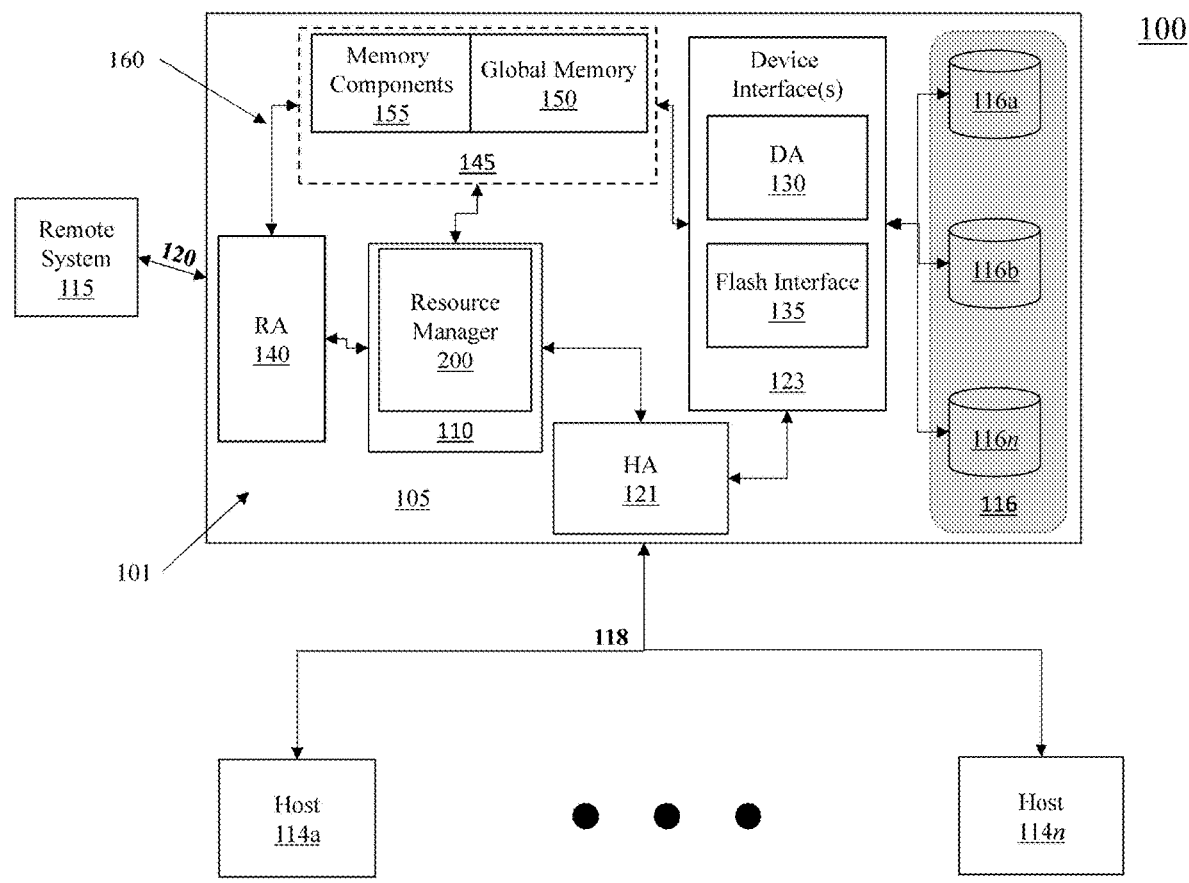
FIG. 1 is a block diagram of a storage system in accordance with example embodiments disclosed herein.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host devices/systems 114a-n can define a first communication network 118. Likewise, the array 105 and a remote system 115 can define a second communication network 120. Additionally, the array's RA 140 can manage communications between the array 105 and an external storage system (e.g., remote system 115) using the networks 118, 120. The networks 118,120 can form one or more of the following network topologies: wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The networked devices 105, 114a-n, 115, and the like can connect to the networks 118, 120 via a wired/wireless network connection interface, bus, data link, and the like. Further, the networks 118, 120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more hosts 114a-n can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116a-n, the array's memory 145 can have different storage performance capabilities.

In embodiments, a service level agreement (SLA) can define at least one Service Level Objective (SLO) the hosts 114a-n require from the array 105. For example, the hosts 115a-n can include host-operated applications that generate or require data. Moreover, the data can correspond to distinct data categories, and thus, each SLO can specify a service level (SL) for each data category. Further, each SL can define a storage performance requirement (e.g., a response time and uptime).

Figure 1A:
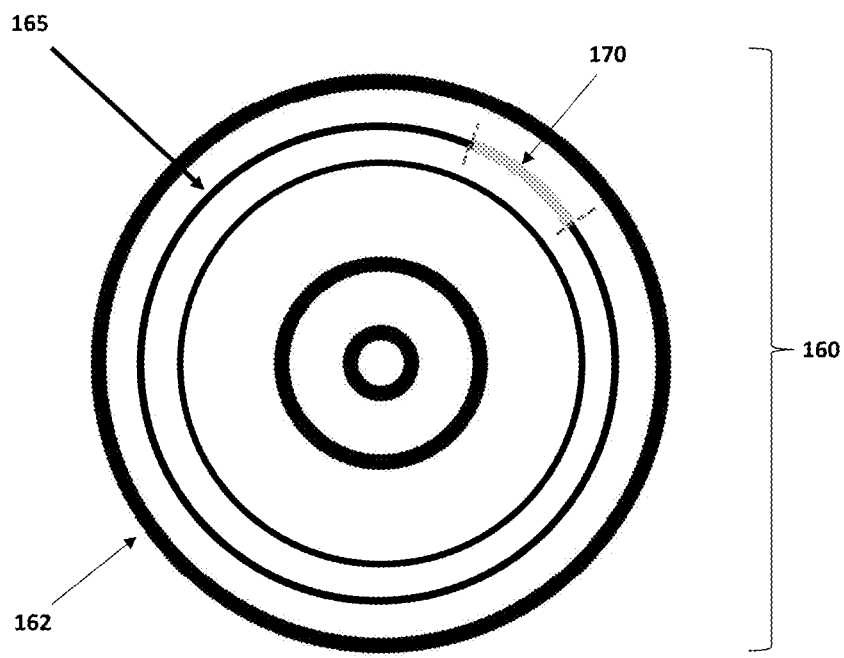
FIG. 1A is a cross-sectional view of a storage device in accordance with embodiments of the present disclosure.

Regarding FIG. 1A, the array 105 can persistently store data on one of its storage devices 116a-n. For example, one of the array's storage devices 116a-n can include an HDD 160 having stacks of cylinders 162. Further, a cylinder 162, like a vinyl record's grooves, can include one or more tracks 165. Thus, the storage array 105 can store data on one or more portions of a disk's tracks 165.

In embodiments, the HA 121 can present the hosts 114a-n with logical representations of slices or portions of the array's physical storage devices 116a-n. For example, a logical unit number (LUN) or virtual storage volume can logically represent a collection of addresses spaces from one or more storage devices 116a-n. Further, a track identifier (TID) can logically represent each address space of a LUN. Moreover, each TID can logically represent a physical storage track unit in example embodiments. Accordingly, the hosts 114a-n can include at least one TID in a metadata field of each IO request sent to the array 105. As such, the HA 121 can direct IO requests by reading the TIDs from each IO request's metadata fields. In addition, the HA 121 can also create a searchable data structure, mapping logical storage representations to their related physical storage address spaces.

In embodiments, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

Further, the array 105 can include several IO processing layers. The IO processing layers can include, e.g., a network/communications (CDI) (e.g., Fibre or NVME), HA 121, EDS 110, DA130, RA 140, Cache (e.g., memory 145), metadata processing (MDP) layers, and the like. Furthermore, each layer can comprise many IO processing features (e.g., hyperparameters). For example, the IO hyperparameters can manage device arrival IO queue depths, QOS queue depths, async read-miss queue depths, logical device slice (TDAT) queue depths, copy request queue depths, prefetch queue depths, and the like. As such, the EDS 110 can include a resource manager 200 that can tune the storage array's resource allocations based on the global impact of each array feature (e.g., hyperparameter), as described in greater detail below.

Figure 2:
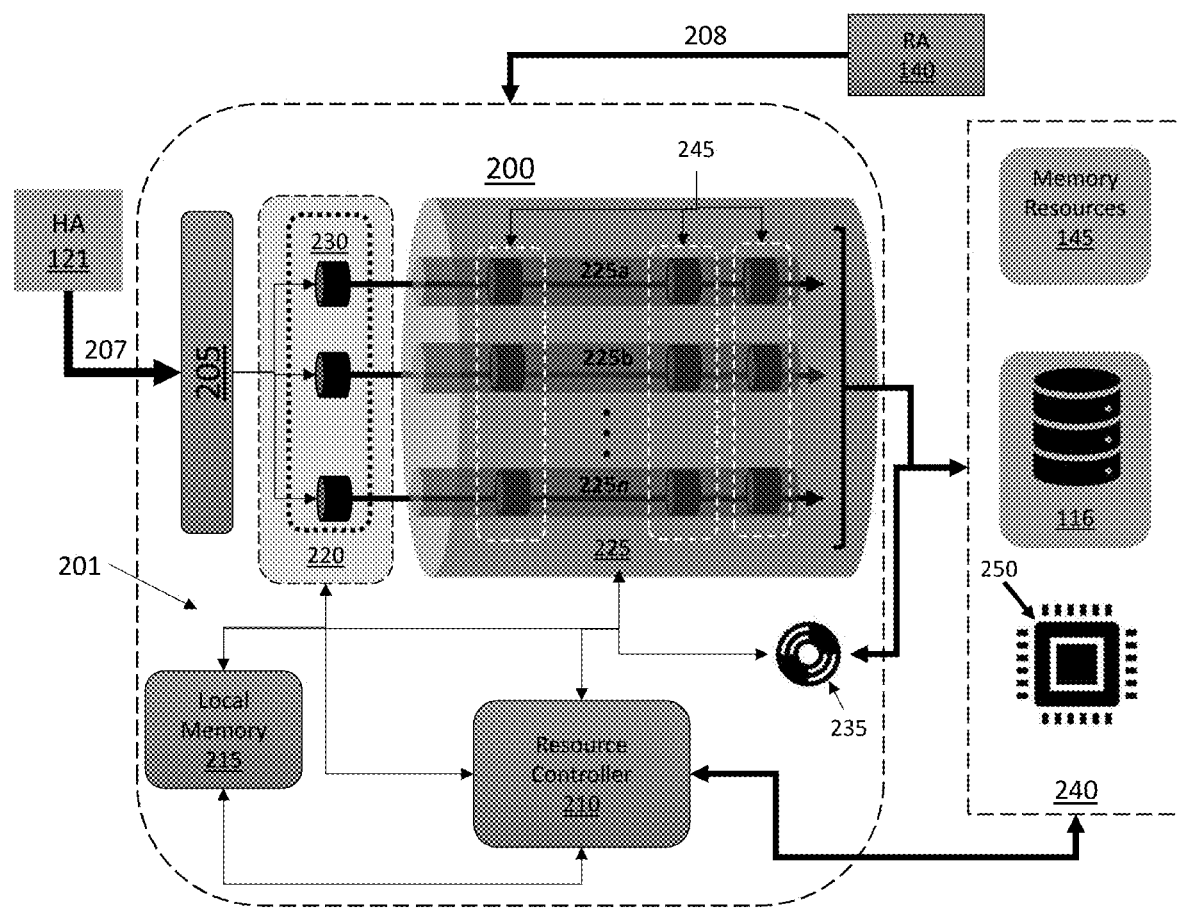
FIG. 2 is a block diagram of a resource manager in accordance with example embodiments disclosed herein.

Regarding FIG. 2, a resource manager 200 can include logic/circuitry elements 201 that tune the array's resource allocations based on a storage array feature's impact on the array's global performance.

In embodiments, the HA 121 can receive an IO workload 207, including one or more IOs from host devices (e.g., hosts 114a-n of FIG. 1). In addition, the manager 200 can include a workload analyzer 205 that can access the IO workload via the array's internal communication channels (e.g., channels 160 of FIG. 1). Furthermore, the analyzer 205 can include logic/circuitry components that analyze the IOs. For example, the analyzer 205 can identify one or more characteristics of the workload's IOs. For instance, each IO can include metadata defining one or more of the following: an IO type, data track related to the data involved with each IO, time, performance metrics, host performance requirement, and telemetry data, amongst other storage array and IO-related information. The analyzer 205 can identify workload and IO request patterns based on historical or current IO characteristic data. In addition, the analyzer 205 can include logic or circuitry defining a neural network pattern identifier in embodiments. Thus, the analyzer 205 can process historical or current IO requests through its neural network pattern identifier to workload and IO trends.

Further, the analyzer 205 can dynamically monitor the array's resources 240, such as the array's storage device 116, memory 145, and processor 250 resources. For example, the memory 145 and storage devices 116 can have storage or memory portions (e.g., slices, sectors, and the like). In addition, the resource manager's local memory 215 can store a logical-to-physical address space map that associates virtual storage or memory portions to their corresponding address space identifier (ID). Each address space ID defines its related storage resource portion's physical memory or storage local. Using the address space map, the analyzer 205 can monitor the resources 240 by maintaining an activity log of events related to each storage or memory portion.

In embodiments, the array 105 can include daemons 235 that communicatively couple to the array's resources 240 via, e.g., a Fibre channel 160 of FIG. 1. Accordingly, the analyzer 205 can identify the array's features (hyperparameters) 245 by issuing a discovery message to the array's daemons. In other examples, the analyzer 205 can identify the array's features using an array config stored in the local memory 215. Further, the daemons 235 can record their related resource's activity in their respective activity logs. Each record can include information defining IO read/write requests associated with each feature (hyperparameter), processor consumption, and storage or memory access. The information can include device characteristics such as read/write data type, data size, storage/memory slot size, read/write performance, SL requirement, and telemetry data, amongst other event-related metadata. The read/write performance can correspond to the array's response time to service each storage or memory portion-related IO read/write request. For example, the daemons 235 can monitor one or more IO processing threads 225a-n (collectively, 225). Moreover, the processing threads 225 can include processing elements 245. Further, each processing element 245 can correspond to a hyperparameter (e.g., array feature). Thus, the daemons 235 can log each feature's activity levels while the array 105 processes the IO workload 207.

In embodiments, the analyzer 205 can obtain current/historical workload samples from one or more remote systems (e.g., remote system 115 of FIG. 1). The remote systems can be field-deployed or testing-environment storage arrays. Further, the analyzer 205 can select remote systems based on their respective configuration profiles. For example, the analyzer 205 can compare the array's configuration (e.g., via config information stored in the local memory 215) to available remote systems. Accordingly, the analyzer 205 can select remote systems with configurations similar to the array 105. Additionally, the analyzer 205 can select remote systems that include workload samples similar to the workloads received by the array 105.

In embodiments, the analyzer 205 can generate one or more storage resource snapshots by periodically analyzing each daemon's activity log or using timestamps related to the remote workload samples. The analyzer 205 can further store the snapshots in the local memory 215. In other embodiments, the daemons 331 can randomly or periodically issue activity log reports to the analyzer 205. For example, the analyzer 205 can generate a daemon reporting schedule that defines each daemon's event collection period's duration, start time, or end time. The analyzer 205 can establish the reporting schedules based on patterns of the historical/current workloads, each workload's IO requests, and storage resource activity levels. Further, the analyzer 205 can generate a storage resources heatmap from each storage resources snapshot. Each heatmap can define each storage resource's activity levels for a current or historical IO workload (e.g., workload 207).

In embodiments, the resource manager 200 can include a resource controller 210 that tunes the array's resource allocations based on a global impact of each array feature (e.g., hyperparameter) 245. For example, the controller 210 can determine each hyperparameter's activity level ranges using the heatmaps. Specifically, the controller 210 can identify the heatmaps that show any given hyperparameter's coldest and hottest activity levels (e.g., lowest and highest activity levels, respectively).

Figure 3:
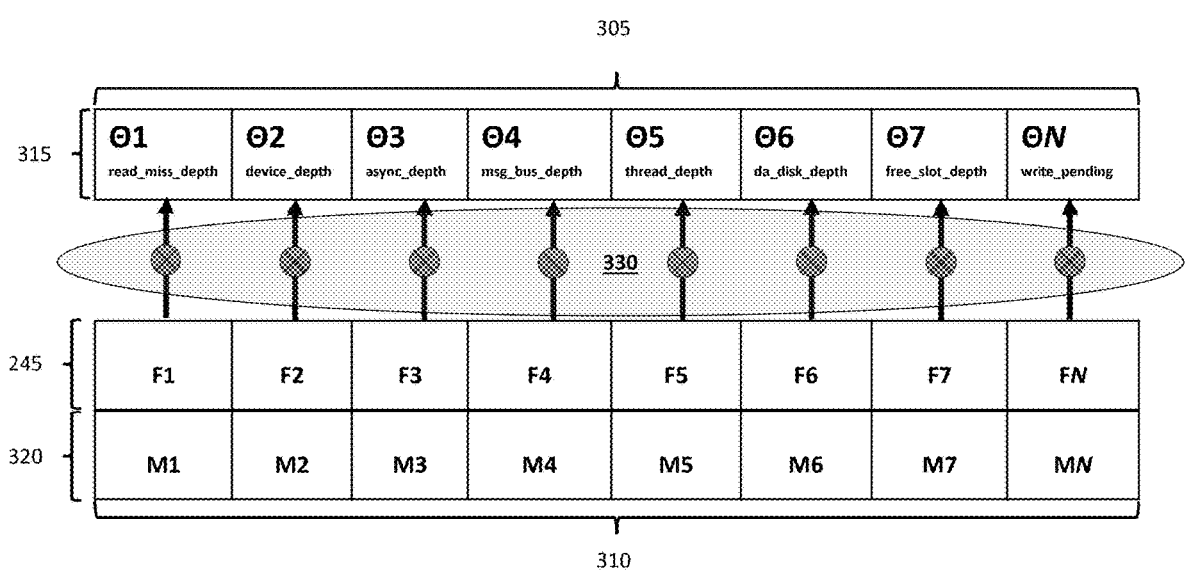
FIG. 3 is a block diagram of a tensor in accordance with embodiments of the present disclosure.

Regarding FIG. 3, the resource manager 200 can generate a tensor 310 that maps the array's features (hyperparameters) 245 to their respective activity ranges 320. In addition, the resource controller 210 can generate saliency parameters 315 that define each hyperparameter's global impact on the array's IO workload performance (e.g., IOPS or response times). Further, the controller 210 can generate a searchable saliency data structure (e.g., array) 305 that stores each feature's saliency parameters 315. Additionally, the controller 210 can establish a saliency mapping 330 that maps each tensor record 245/320 to its respective saliency parameter 315.

Referring back to FIG. 2, the controller 210 can initialize the saliency parameters 315 between two initialization values. The initialization values can be values statistically shown to enable unbiased machine learning results (e.g., $-(1e^{-2})$ to $+(1e^{-2})$) or another close-to-zero value. Upon initializing the saliency parameters 315, the controller 210 issues perturbation instructions to a tuner 220. The tuner can include perturbing-adapters 230 that dynamically modify a target hyperparameter's activity level ranges. For example, the tuner 220 can assign each adapter 230 to one or more hyperparameters 245. Further, the tuner 220 can couple each adapter 230 to a thread 225a-n, including the adapter's assigned hyperparameter 245.

In embodiments, the controller 210 can generate an initial perturbation signal as a function of one or more of the hyperparameter's initialized saliency parameters and activity level ranges. Using the snapshots and heatmaps generated by the analyzer 205, the controller 210 can analyze the array's performance (e.g., IOPS and response times) in response to the tuner 220 perturbing the hyperameters 245. Specifically, the controller 210 can analyze each hyperparameter's resulting activity levels and modify their respective saliency parameters. Additionally, the controller 210 can generate the saliency parameter values to define an impact gradient. Specifically, the impact gradient defines each hyperparameter's relative global importance (e.g., impact) on the array's performance (IOPS/response times). For example, saliency parameter values can be between '0' and '1,' where parameter values closer to zero indicate low global impact and values closer to 1 indicate high global impact.

Furthermore, the controller 210 can include machine learning logic/circuitry that ingests historical/current activity levels, array performance metrics (e.g., IOPS or response times), saliency parameters, and tensor data. The controller 210 can generate predictive hyperparameter workload impact models using the ingested information. Each model can define storage array resource allocations based on each hyperparameter predictive global impact and anticipated workload/IO characteristics.

The following text includes details of one or more methods or flow diagrams disclosed herein. For simplicity of explanation, the methods are depicted and described as one or more acts. The acts can occur in various orders or concurrently with other acts not presented and described herein. Furthermore, not all illustrated acts may be required to implement the methods described by this disclosure.

Figure 4:
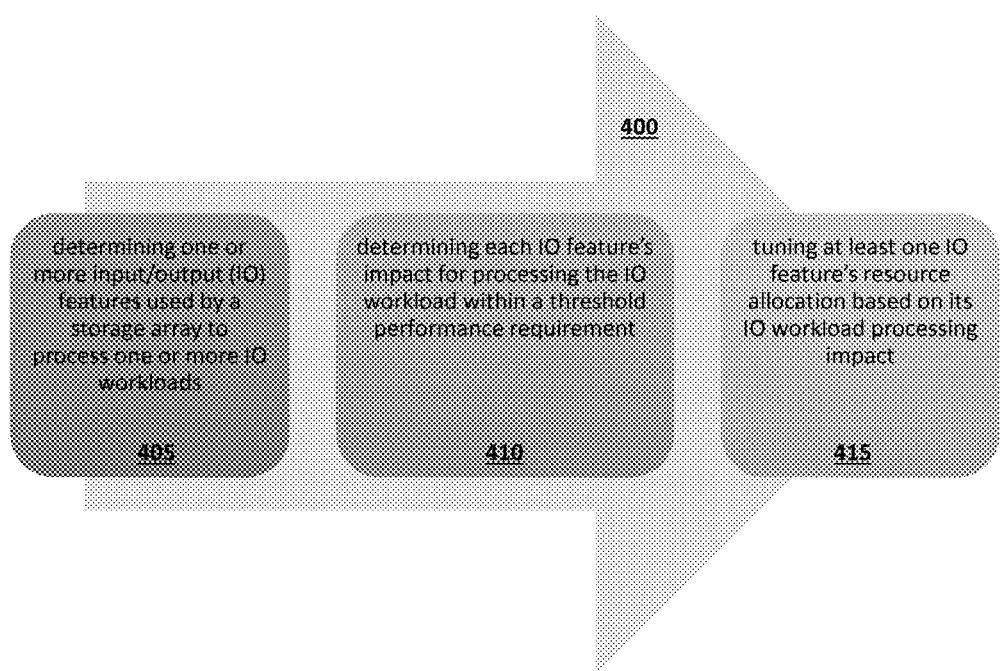
FIG. 4 is a flow diagram of a method for identifying and controlling the sensitivity of the storage array's hyper-parameters according to embodiments of the present disclosure.

Regarding FIG. 4, one or more of the array's components (e.g., components 101 of FIG. 1) can execute the method 400. The method 400 describes acts for globally identifying and controlling the sensitivity of a storage array's hyperparameters. At 405, method 400 can include determining one or more input/output (IO) features a storage array includes to process one or more IO workloads. The method 400, at 410, can also include determining each IO feature's impact for processing the IO workload within a threshold performance requirement. At 415, the method 400 can further include tuning at least one IO feature's resource allocation based on its IO workload processing impact. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a remote server can interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, or elements and combinations thereof.

What is claimed is:

1. A method comprising:
   determining one or more input/output (IO) features used by a storage array to process one or more IO workloads by parsing a configuration element to identify hyperparameters across distinct logic and hardware layers of the storage array, wherein the storage array comprises a host adapter (HA), device adapter (DA), remote adapter (RA), and memory components communicatively coupled via internal communication channels;
   determining each IO feature's impact for processing the IO workload within a threshold performance requirement by:
      initializing saliency parameter values between predefined initialization values for the IO features;
      generating a searchable saliency data structure comprising IO processing depth parameters for read miss, device, async, message bus, thread, DA disk, and free slot operations;
      mapping the IO features to the saliency data structure that correlates each feature to its maximum IO processing load; and
      analyzing performance metrics using machine learning to determine each IO feature's relative global impact on the storage array's performance; and
   tuning at least one IO feature's resource allocation based on its IO workload processing impact by dynamically modifying resource allocations according to the determined global impact of each IO feature, wherein the resource allocations are modified across the distinct logic and hardware layers to improve overall storage array performance, wherein dynamically modifying resource allocations includes dynamically modifying the storage array's storage device, memory, and processor resources, and further dynamically modifying device arrival IO queue depths, quality of service (QOS) queue depths, async read-miss queue depths, logical device slice (TDAT) queue depths, copy request queue depths, and prefetch queue depths.

2. The method of claim 1 further comprising:
   determining each IO feature's load to process the IO workload.

3. The method of claim 2 further comprising:
   measuring each IO feature's IO processing capabilities based on one or more current and/or historical IO workloads.

4. The method of claim 2 further comprising:
   generating a tensor that maps each IO feature to their respective IO processing loads.

5. The method of claim 4, wherein the tensor comprises a data structure having a length corresponding to a number of the determined IO features, wherein each IO feature is mapped to a corresponding maximum IO processing load value in the data structure.

6. The method of claim 5 further comprising:
   initializing a saliency parameter value related to each IO feature;
   generating a searchable saliency data structure; and
   mapping the tensor to the searchable saliency data structure.

7. The method of claim 6 further comprising:
   perturbing each IO feature's corresponding tensor record using each IO feature's corresponding saliency parameter value.

8. The method of claim 7 further comprising:
   measuring at least one of the storage array's IO response times and input/output per second (IOP) rates in response to receiving the IO workload;
   correlating at one of the IO response times and IOP rates to at least one of the IO features;
   determining each IO feature's impact on at least one of the IO response times and IOP rates based on the correlation.

9. The method of claim 7 further comprising:
   tuning at least one IO feature's resource allocation based on its determined impact on the at least one of the IO response times and IOP rates in response to receiving the IO workload.

10. An apparatus comprising a memory and processor configured to:
    determine one or more input/output (IO) features used by a storage array to process one or more IO workloads by parsing a configuration element to identify hyperparameters across distinct logic and hardware layers of the storage array, wherein the storage array comprises a host adapter (HA), device adapter (DA), remote adapter (RA), and memory components communicatively coupled via internal communication channels;
    determine each IO feature's impact for processing the IO workload within a threshold performance requirement by:
       initializing saliency parameter values between predefined initialization values for the IO features;
       generating a searchable saliency data structure comprising IO processing depth parameters for read miss, device, async, message bus, thread, DA disk, and free slot operations;
       mapping the IO features to the saliency data structure that correlates each feature to its maximum IO processing load; and
    analyzing performance metrics using machine learning to determine each IO feature's relative global impact on the storage array's performance; and
    tune at least one IO feature's resource allocation based on its IO workload processing impact by dynamically modifying resource allocations according to the determined global impact of each IO feature, wherein the resource allocations are modified across the distinct logic and hardware layers to improve overall storage array performance, wherein dynamically modifying resource allocations includes dynamically modifying the storage array's storage device, memory, and processor resources, and further dynamically modifying device arrival IO queue depths, quality of service (QOS) queue depths, async read-miss queue depths, logical device slice (TDAT) queue depths, copy request queue depths, and prefetch queue depths.

11. The apparatus of claim 10 further configured to:
determine each IO feature's load to process the IO workload.

12. The apparatus of claim 11 further configured to:
measure each IO feature's IO processing capabilities based on one or more current and/or historical IO workloads.

13. The apparatus of claim 11 further configured to:
generate a tensor that maps each IO feature to their respective IO processing loads.

14. The apparatus of claim 13, wherein the tensor comprises a data structure having a length corresponding to a number of the determined IO features, wherein each IO feature is mapped to a corresponding maximum IO processing load value in the data structure.

15. The apparatus of claim 14 further configured to:
initialize a saliency parameter value related to each IO feature;
generate a searchable saliency data structure; and
map the tensor to the searchable saliency data structure.

16. The apparatus of claim 15 further configured to:
perturb each IO feature's corresponding tensor record using each IO feature's corresponding saliency parameter value.

17. The apparatus of claim 16 further configured to:
measure at least one of the storage array's IO response times and input/output per second (IOP) rates in response to receiving the IO workload;
correlate at one of the IO response times and IOP rates to at least one of the IO features;
determine each IO feature's impact on at least one of the IO response times and IOP rates based on the correlation.

18. The apparatus of claim 16 further configured to:
tune at least one IO feature's resource allocation based on its determined impact on the at least one of the IO response times and IOP rates in response to receiving the IO workload.

* * * * *